United States Patent Office 2,776,261
Patented Jan. 1, 1957

2,776,261
ZINC TIN PHOSPHATE PHOSPHORS

Francis N. Shaffer and Alden B. Davis, Towanda, Pa., assignors to Sylvania Electric Products Inc., Salem, Mass., a corporation of Massachusetts No Drawing. Application April 10, 1951,
Serial No. 220,341

3 Claims. (Cl. 252—301.6)

This invention relates to phosphors for excitation by ultraviolet rays, cathode rays, X-rays and the like, and particularly to zinc phosphate phosphors.

A zinc phosphate phosphor has been previously known for cathode ray excitation, but it was activated solely by manganese and did not respond to excitation by ultraviolet radiation in the vicinity of the 2537 angstrom unit mercury wavelength normally used in fluorescent lamps of the general illumination types.

We have found that the replacement of the manganese in whole or in part by tin will cause the zinc phosphate phosphor to respond brightly to ultraviolet radiations of 2537 angstrom unit wavelength and thereabouts. If some manganese is present, the phosphor will also respond to cathode rays.

The phosphor activated solely with tin emits a white to orange color with a broad emission band peaking around 6100 angstrom units. The addition of manganese shifts the color more toward the red.

The phosphor may be used either alone or blended with other phosphors to obtain desired spectral energy distribution.

The tin content necessary for maximum brightness is relatively large if tin is considered as an activator in the usual sense. At least part of this tin must be in the phosphor in the stannous state in order to obtain fluorescence under 2537 A. U. radiation. The stannous state of the tin is obtained and controlled by firing the phosphors in a controlled slightly reducing atmosphere. We prefer a mixture of nitrogen and hydrogen, or of nitrogen, hydrogen and steam but other combinations of inert and reducing gases can be used, or other gases that are of a slightly reducing nature.

The best phosphors are obtained with compositions having a mol ratio of zinc oxide to the phosphate radical greater than that of 2.0 corresponding to the pyrophosphate and less than that of 3.0 corresponding to the orthophosphate. Phosphors having the stoichiometric pyrophosphate and orthophosphate proportions give a sharp reduction in efficiency, especially in the red output.

The materials used in preparing the phosphors should be of the usual high degree of purity necessary for phosphor preparation. We prefer to use zinc ammonium phosphate, zinc oxide, stannous oxide and manganous carbonate as starting materials. Other materials may be used to obtain the same results.

Tri-zinc phosphate, zinc carbonate or a zinc compound which breaks down to the oxide upon heating may be used with ammonium phosphate to get any desired zinc to phosphate ratio. Tin and manganese may be added as the phosphate, halide or as compounds reducible by heat to the oxide.

These materials in the correct proportions are mixed intimately, by pebble milling or by any other suitable method. This mixture is then fired at a temperature between 1200 F. and 1600° F. in a controlled atmosphere. The time of firing necessary for complete reaction is dependent upon the temperature and atmosphere used.

Another method of firing which has been found satisfactory is to fire the mixture initially in air at a temperature high enough to react the materials and form the zinc phosphate matrix. This material is then mortared or ground and refired in the controlled atmosphere to reduce the tin to the stannous state required for fluorescence under U. V.

We will describe, as one specific embodiment of our invention, the preparation of a zinc phosphate phosphor containing tin and manganese of the following composition:

| | |
|---|---|
| Zinc | gram atoms__ 2.60 |
| Tin | do____ .20 |
| Manganese | do____ .05 |
| Phosphate ($PO_4$) | gram mols__ 2.00 |

In making a phosphor of such a composition, the following starting ingredients are mortar ground together dry as fine powders:

| | Grams |
|---|---|
| Zinc ammonium phosphate | 17.9 |
| Zinc oxide | 2.44 |
| Stannous oxide | 1.34 |
| Manganese carbonate (44.3% Mn) | 0.31 |

The mortared mixture is fired in air for one-half hour at 1380° F., then cooled and again ground in a mortar. It is then refired in a small porcelain crucible in an atmosphere mixture of 96.5% nitrogen and 3.5% hydrogen for one hour at 1380° F. and allowed to cool to room temperature in the same atmosphere. The phosphor cake is then crushed into the form of fine powder particles.

The phosphor activated by tin alone can be prepared similarly, by omitting the manganous carbonate in the starting mixture.

The variation in emission as the ratio of zinc to phosphate radical is varied from the pyrophosphate composition of 2.00 to the orthophosphate composition of 3.00 is shown in the following table, in which the proportions of the various components are given in gram-atoms or gram-moles, and in which the emission values are readings obtained using a Zeiss-Pulfrich photometer through red, green and blue filters relative to an arbitrary standard.

| Composition | | | Relative Emission | | |
|---|---|---|---|---|---|
| Zn | Sn | $PO_4$ | Red | Green | Blue |
| 2.00 | .05 | 2.00 | 10 | 56 | 45 |
| 2.20 | .05 | 2.00 | 44 | 75 | 60 |
| 2.40 | .05 | 2.00 | 43 | 76 | 63 |
| 2.60 | .05 | 2.00 | 43 | 76 | 63 |
| 2.80 | .05 | 2.00 | 43 | 78 | 65 |
| 2.95 | .05 | 2.00 | 38 | 75 | 62 |
| 3.00 | .05 | 2.00 | 2 | 37 | 32 |

The above table shows that the emission is substantially constant from about 2.2 to 2.95 moles of zinc per two moles of phosphate radical but drops sharply as the stoichiometric ratios of 2.00 and 3.00 are approached.

The table below, taken similarly to that of the preceding table, shows that useful phosphors can be made over a wide range of tin ratios:

| Composition | | | Relative Emission | | |
|---|---|---|---|---|---|
| Zn | Sn | PO$_4$ | Red | Green | Blue |
| 2.80 | .05 | 2.00 | 37 | 65 | 55 |
| 2.65 | .20 | 2.00 | 56 | 85 | 72 |
| 2.55 | .30 | 2.00 | 62 | 86 | 71 |
| 2.45 | .40 | 2.00 | 66 | 90 | 68 |
| 2.35 | .50 | 2.00 | 63 | 87 | 68 |
| 2.00 | .70 | 2.00 | 57 | 85 | 66 |
| 2.20 | .20 | ---- | 58 | 91 | 72 |
| 2.80 | .01 | 2.00 | 12 | 68 | 65 |
| 2.80 | .05 | 2.00 | 37 | 65 | 55 |
| 2.80 | .10 | 2.00 | 48 | 69 | 63 |
| 2.80 | .20 | 2.00 | 50 | 77 | 65 |
| 2.80 | .30 | 2.00 | 37 | 53 | 44 |

The maximum brightness occurs between about .020 and 0.70 gram-atoms per 2.0 gram-moles of phosphate radical.

The values given for 2.80 gram-atoms of zinc and 0.05 gram-atoms of tin vary somewhat in the two tables. This is merely due to the usual small variation obtained from batch to batch in phosphor making.

The emission values given in the table were obtained with excitation by a constant source of 2537 Angstrom ultraviolet radiation. The emission can be shifted toward the red by the addition of manganese, and the phosphor will then have the additional advantage of responding also to cathode ray excitation. In response to the latter radiation, the emission color is more dependent on the manganese concentration, the wavelength of the emitted light increasing with increasing manganese. The amount of the latter present has a much greater effect under cathode ray excitation than it does under ultraviolet excitation as shown by the following table:

| Composition | | | | Relative Emission (Ultraviolet Excitation) | | | Emission Color (Cathode by Excitation) |
|---|---|---|---|---|---|---|---|
| Zn | Sn | Mn | PO$_4$ | Red | Green | Blue | |
| 2.63 | 0.2 | 0.02 | 2.00 | 64 | 88 | 68 | Yellow-Green. |
| 2.60 | 0.2 | 0.05 | 2.00 | 67 | 90 | 68 | Yellow-Orange. |
| 2.55 | 0.2 | 0.10 | 2.00 | 67 | 87 | 68 | Orange-Red. |

Thus while the color-components do not vary greatly under ultraviolet excitation, the color shifts from yellow to red under cathode ray excitation.

What we claim is:

1. A zinc phosphate phosphor having an activator selected from the group consisting of tin, and tin and manganese; and in which the zinc content is between about 2.2 and 2.95 moles per two moles of the phosphate radical, with the tin content between about 0.2 and 0.7 mole per two moles of the phosphate radical; a substantial part of the tin being in the stannous state, and the amount of manganese, when present, being between about 0.02 and 0.1 mole per two moles of phosphate radical.

2. A tin activated zinc phosphate phosphor in which the zinc content is between about 2.2 and 2.95 moles per two moles of the phosphate radical, with the tin content between about 0.2 and 0.7 mole per two moles of the phosphate radical, a substantial part of the tin being in the stannous state.

3. A tin and manganese-activated phosphor, in which the zinc content is between about 2.2 and 2.95 moles per two moles of the phosphate radical, with the tin content between about 0.2 and 0.7 mole per two moles of the phosphate radical, a substantial part of the tin being in the stannous state, and the amount of maganese present being between about 0.02 and 0.1 mole per two moles of phosphate radical.

References Cited in the file of this patent

UNITED STATES PATENTS 2,270,124     Huniger _____ Jan. 13, 1942